United States Patent
Dries

(10) Patent No.: US 11,051,673 B2
(45) Date of Patent: Jul. 6, 2021

(54) SUSPENSION SYSTEM FOR A FLUID CIRCULATION ASSEMBLY OF A DISHWASHER APPLIANCE

(71) Applicant: Haier US Appliance Solutions, Inc., Wilmington, DE (US)

(72) Inventor: John Edward Dries, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 402 days.

(21) Appl. No.: 15/956,798

(22) Filed: Apr. 19, 2018

(65) Prior Publication Data

US 2019/0320870 A1 Oct. 24, 2019

(51) Int. Cl.
*A47L 15/00* (2006.01)
*A47L 15/42* (2006.01)
*F16F 15/08* (2006.01)

(52) U.S. Cl.
CPC ....... *A47L 15/0052* (2013.01); *A47L 15/4219* (2013.01); *A47L 15/4225* (2013.01); *A47L 15/4202* (2013.01); *F16F 15/08* (2013.01)

(58) Field of Classification Search
CPC ............. A47L 15/4219; A47L 15/4225; A47L 15/0052; F16F 15/08
See application file for complete search history.

(56) References Cited

U.S. PATENT DOCUMENTS

| | | | |
|---|---|---|---|
| 2,880,740 A | 4/1959 | Peglow | |
| 3,355,111 A * | 11/1967 | Barnstead | A47L 15/4246 239/251 |
| 3,407,747 A * | 10/1968 | Rule | F04D 29/606 417/360 |
| 3,768,116 A * | 10/1973 | Propst | B60B 33/0002 16/43 |
| 3,963,046 A | 6/1976 | Bergeson | |
| 4,221,547 A | 9/1980 | Hoffman et al. | |
| 5,174,318 A | 12/1992 | Dingler et al. | |
| 6,138,980 A * | 10/2000 | Farbotnik | F16B 5/0258 248/634 |
| 6,811,617 B2 * | 11/2004 | Elick | A47L 15/4225 134/10 |

(Continued)

FOREIGN PATENT DOCUMENTS

| | | |
|---|---|---|
| CN | 102578982 | 7/2012 |
| CN | 202489911 | 10/2012 |

(Continued)

OTHER PUBLICATIONS

Machine translation of EP-0381586-B1, dated Dec. 1994. (Year: 1994).*

(Continued)

*Primary Examiner* — Kevin G Lee

(74) *Attorney, Agent, or Firm* — Dority & Manning, P.A.

(57) ABSTRACT

A dishwasher appliance includes a tub that defines a wash chamber for receipt of articles for washing. A sump is positioned at a bottom of the wash chamber for receiving fluid from the wash chamber. A fluid circulation assembly is at least partially disposed within the sump. The fluid circulation assembly is mounted in the sump with a resilient mounting post, whereby the fluid circulation assembly is vibrationally isolated from the sump.

16 Claims, 7 Drawing Sheets

(56) References Cited

U.S. PATENT DOCUMENTS

| | | |
|---|---|---|
| 9,649,006 B2 | 5/2017 | Dries |
| 9,693,670 B2 | 7/2017 | Dries |
| 2020/0300263 A1* | 9/2020 | Wienecke ............. F04D 29/605 |

FOREIGN PATENT DOCUMENTS

| | | | | |
|---|---|---|---|---|
| CN | 203400110 | | 1/2014 | |
| CN | 203789881 | | 8/2014 | |
| CN | 204698481 | | 10/2015 | |
| EP | 381586 A1 | | 8/1990 | |
| EP | 0381586 B1 | * | 12/1994 | ......... A47L 15/4225 |
| KR | 20070113639 A | | 11/2007 | |

OTHER PUBLICATIONS

International Search Report and English Translation Thereof, PCT Application No. PCT/CN2019/083342, dated Jul. 30, 2019, 7 pages.

\* cited by examiner

SUSPENSION SYSTEM FOR A FLUID CIRCULATION ASSEMBLY OF A DISHWASHER APPLIANCE

FIELD OF THE INVENTION

The subject matter of the present disclosure relates generally to dishwasher appliances, and more particularly to a suspension system for mounting a fluid circulation assembly within a dishwasher appliance.

BACKGROUND OF THE INVENTION

Dishwasher appliances generally include a tub that defines a wash compartment. Rack assemblies can be mounted within the wash chamber of the tub for receipt of articles for washing. Spray assemblies within the wash chamber can apply or direct wash fluid towards articles disposed within the rack assemblies in order to clean such articles. Multiple spray assemblies can be provided including e.g., a lower spray arm assembly mounted to the tub at a bottom of the wash chamber, a mid-level spray arm assembly mounted to one of the rack assemblies, and/or an upper spray assembly mounted to the tub at a top of the wash chamber.

Dishwasher appliances further typically include a fluid circulation system which is in fluid communication with the spray assemblies for circulating fluid to the spray assemblies. The fluid circulation system generally receives fluid from the wash chamber, filters soil from the fluid, and pumps the filtered fluid to the spray assemblies. Additionally, unfiltered fluid can be pumped to a drain as required.

Various operations of the fluid circulation system, e.g., pumping fluid, rotating the spray arms, etc. often generate significant noise. Further, the shape of the tub, and in particular a portion of the tub where the fluid circulation system is located, may serve to amplify the noise generated during such operations.

Accordingly, improved means for mounting fluid circulation systems in dishwasher appliances are desired. In particular, fluid circulation system mounts which reduce the level of noise generated during dishwasher appliance operation would be advantageous.

Aspects and advantages of the invention will be set forth in part in the following description, or may be obvious from the description, or may be learned through practice of the invention.

In accordance with one embodiment, a dishwasher appliance is provided. The dishwasher appliance defines a vertical direction, a lateral direction, and a transverse direction that are mutually perpendicular. The dishwasher appliance includes a tub that defines a wash chamber for receipt of articles for washing. A sump is positioned at a bottom of the wash chamber for receiving fluid from the wash chamber. A fluid circulation assembly is at least partially disposed within the sump. The fluid circulation assembly is mounted in the sump with a resilient mounting post, whereby the fluid circulation assembly is vibrationally isolated from the sump.

In accordance with another embodiment, a dishwasher appliance is provided. The dishwasher appliance defines a vertical direction, a lateral direction, and a transverse direction that are mutually perpendicular. The dishwasher appliance includes a tub that defines a wash chamber for receipt of articles for washing. A sump is positioned at a bottom of the wash chamber for receiving fluid from the wash chamber. A resilient mounting post is disposed within the sump. The resilient mounting post is configured to mount a fluid circulation assembly in the sump and configured to vibrationally isolate the fluid circulation assembly from the sump.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention including the best mode thereof, directed to one of ordinary skill in the art, is set forth in the specification, which makes reference to the appended figures.

DETAILED DESCRIPTION OF THE INVENTION

Figure 1:
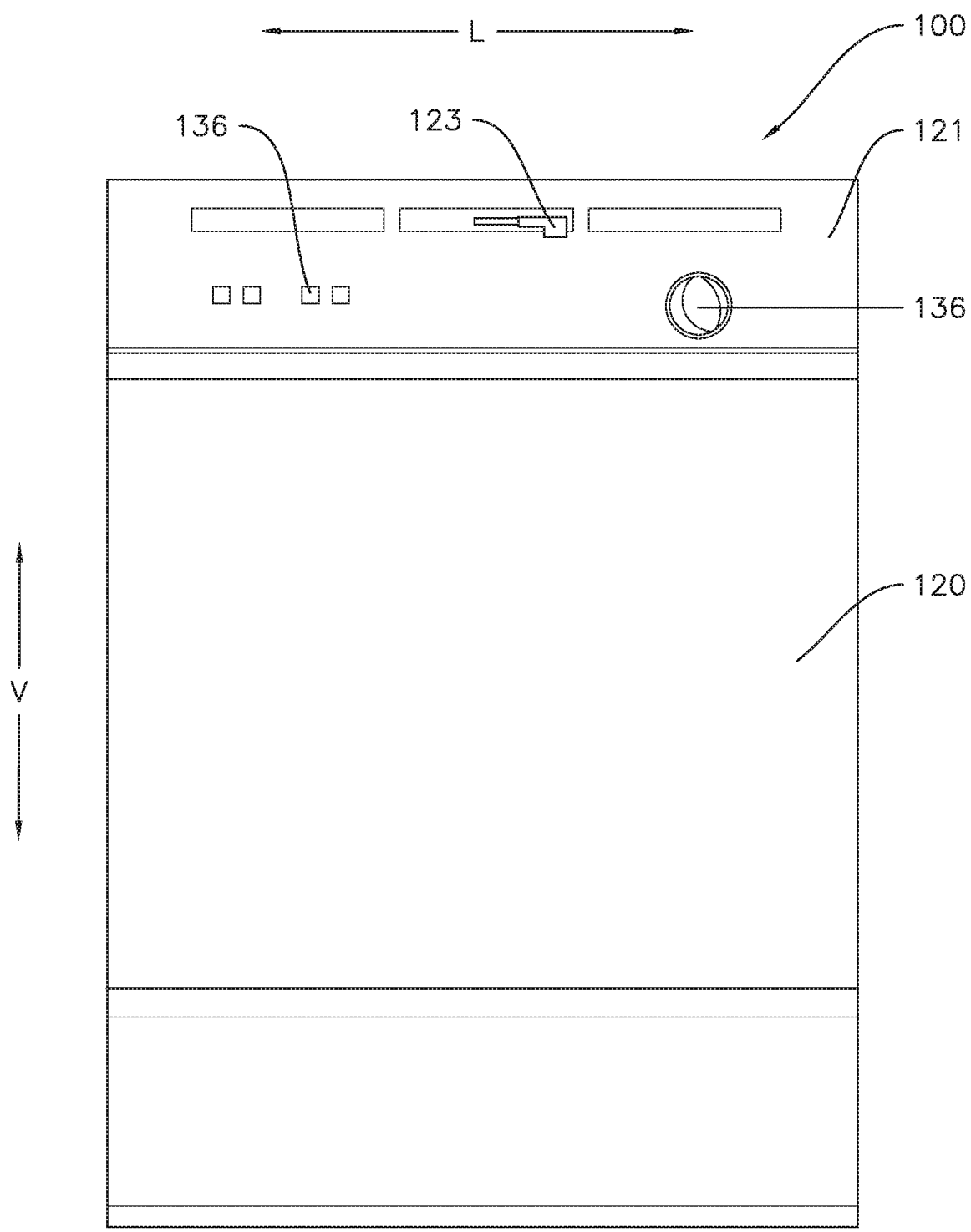
FIG. 1 provides a front view of a dishwasher appliance in accordance with one or more embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "article" may refer to, but need not be limited to, dishes, pots, pans, silverware, and other cooking utensils and items that can be cleaned in a dishwasher appliance. The term "wash cycle" is intended to refer to one or more periods of time during the cleaning process where a dishwasher appliance operates while containing articles to be washed and uses a detergent and water to, e.g., remove soil particles including food and other undesirable elements from the articles. The term "rinse cycle" is intended to refer to one or more periods of time during the cleaning process in which the dishwasher appliance operates to remove residual soil, detergents, and other undesirable elements that were retained by the articles after completion of the wash cycle. The term "drying cycle" is intended to refer to one or more periods of time in which the dishwasher appliance is operated to dry the articles by removing fluids from the wash chamber. The term "fluid" refers to a liquid used for washing and/or rinsing the articles and is typically made up of water that may include additives such as e.g., detergent or other treatments.

As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 2:
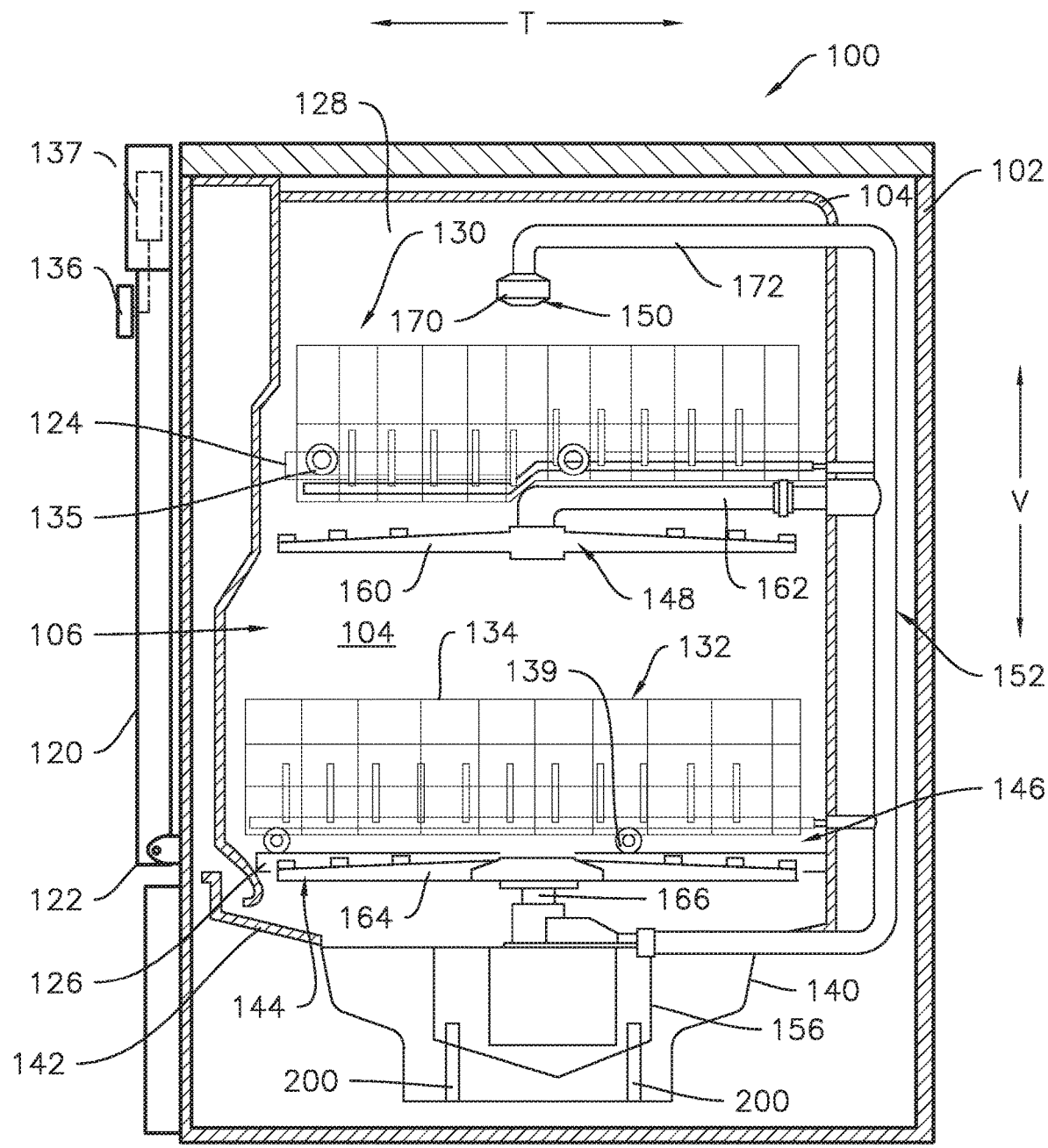
FIG. 2 provides a side, cross-sectional view of the dishwasher appliance of FIG. 1.

FIGS. 1 and 2 depict an exemplary domestic dishwasher appliance 100 that may be configured in accordance with aspects of the present disclosure. For the particular embodiment of FIGS. 1 and 2, the dishwasher appliance 100 includes a cabinet 102 having a tub 104 therein that defines a wash chamber 106. As shown, the dishwasher appliance 100 (such as the cabinet 102 thereof) defines a vertical direction V, a lateral direction L, and a transverse direction T, which are mutually orthogonal and define a coordinate system for the dishwasher appliance. The tub 104 includes a front opening (not shown) and a door 120 hinged at its bottom 122 for movement between a normally closed vertical position (shown in FIGS. 1 and 2), wherein the wash chamber 106 is sealed shut for washing operation, and a horizontal open position for loading and unloading of articles from the dishwasher. A latch 123 may be used to lock and unlock door 120 for access to chamber 106.

The dishwasher appliance 100 may include a sump 140. As shown in FIG. 2, the sump 140 may be positioned at a bottom of the wash chamber 106 for receiving fluid from the wash chamber 106. The sump 140 may be connected to the bottom wall 142 of the tub 104 and fluid may for example flow from the bottom wall 142 into the sump 140.

Upper and lower guide rails 124, 126 are mounted on tub side walls 128 and accommodate roller-equipped rack assemblies 130 and 132. Each of the rack assemblies 130, 132 is fabricated into lattice structures including a plurality of elongated members 134 (for clarity of illustration, not all elongated members making up assemblies 130 and 132 are shown in FIG. 2). Each rack 130, 132 is adapted for movement between an extended loading position (not shown) in which the rack is substantially positioned outside the wash chamber 106, and a retracted position (shown in FIGS. 1 and 2) in which the rack is located inside the wash chamber 106. This is facilitated by rollers 135 and 139, for example, mounted onto racks 130 and 132, respectively. A silverware basket (not shown) may be removably attached to rack assembly 132 for placement of silverware, utensils, and the like, that are otherwise too small to be accommodated by the racks 130, 132.

The dishwasher appliance 100 further includes a lower spray-arm assembly 144 that is rotatably mounted within a lower region 146 of the wash chamber 106 and above a bottom wall 142 of the tub 104 so as to rotate in relatively close proximity to rack assembly 132. A mid-level spray-arm assembly 148 is located in an upper region of the wash chamber 106 and may be located in close proximity to upper rack 130. Additionally, an upper spray assembly 150 may be located above the upper rack 130.

Each spray assembly 144, 148, 150 may include a spray arm or other sprayer and a conduit in fluid communication with the sprayer. For example, mid-level spray-arm assembly 148 may include a spray arm 160 and a conduit 162. Lower spray-arm assembly 144 may include a spray arm 164 and a conduit 166. Additionally, upper spray assembly 150 may include a spray head 170 and a conduit 172 in fluid communication with the spray head 170. Each spray assembly 144, 148, 150 includes an arrangement of discharge ports or orifices for directing washing liquid received from a fluid circulation assembly 156 onto dishes or other articles located in rack assemblies 130 and 132. The arrangement of the discharge ports in spray-arm assemblies 144 and 148 provides a rotational force by virtue of washing fluid flowing through the discharge ports. The resultant rotation of the spray-arm assemblies 144 and 148 and the operation thereof using fluid from fluid circulation assembly 156 provides coverage of dishes and other dishwasher contents with a washing spray. Other configurations of spray assemblies may be used as well. For example, dishwasher 100 may have additional spray assemblies for cleaning silverware, for scouring casserole dishes, for spraying pots and pans, for cleaning bottles, etc.

In the illustrated example embodiment of FIG. 2, the mid-level spray-arm assembly 148 and the upper spray assembly 150 are connected to the fluid circulation assembly 156 via a fluid circulation conduit 152. The lower spray arm assembly 144 may be connected directly to the fluid circulation assembly 156, e.g., to a diverter 500 (FIG. 6) thereof, thus, the lower spray arm assembly 144 may be considered a part of the fluid circulation assembly 156, and, as such, the lower spray arm assembly may be vibrationally isolated from the sump 140, as described in more detail below. Each spray assembly 144, 148, 150 may receive an independent stream of fluid, may be stationary, and/or may be configured to rotate in one or both directions. For example, a single spray arm may have multiple sets of discharge ports, each set receiving wash fluid from a different fluid conduit, and each set being configured to spray in opposite directions and impart opposite rotational forces on the spray arm. In order to avoid stalling the rotation of such a spray arm, wash fluid is typically only supplied to one of the sets of discharge ports at a time.

The dishwasher appliance 100 is further equipped with a controller 137 to regulate operation of the dishwasher appliance 100. The controller may include one or more memory devices and one or more microprocessors, such as general or special purpose microprocessors operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor.

The controller 137 may be positioned in a variety of locations throughout dishwasher appliance 100. In the illustrated embodiment, the controller 137 may be located within a control panel area 121 of door 120 as shown in FIGS. 1 and 2. In such an embodiment, input/output ("I/O") signals may be routed between the control system and various operational components of dishwasher 100 along wiring harnesses that may be routed through the bottom 122 of door 120. Typically, the controller 137 includes a user interface panel/controls 136 through which a user may select various operational features and modes and monitor progress of the dishwasher 100. In one embodiment, the user interface 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. The user interface 136 may be in communication with the controller 137 via one or more signal lines or shared communication busses. It should be noted that controllers 137 as disclosed herein are capable of and may be operable to perform any methods and associated method steps as disclosed herein.

It should be appreciated that the invention is not limited to any particular style, model, or configuration of dishwasher. The exemplary embodiment depicted in FIGS. 1 and 2 is for illustrative purposes only. For example, different locations may be provided for user interface 136, different configurations may be provided for racks 130, 132, different combinations of spray assemblies may be utilized, and other differences may be applied as well.

Figure 3:
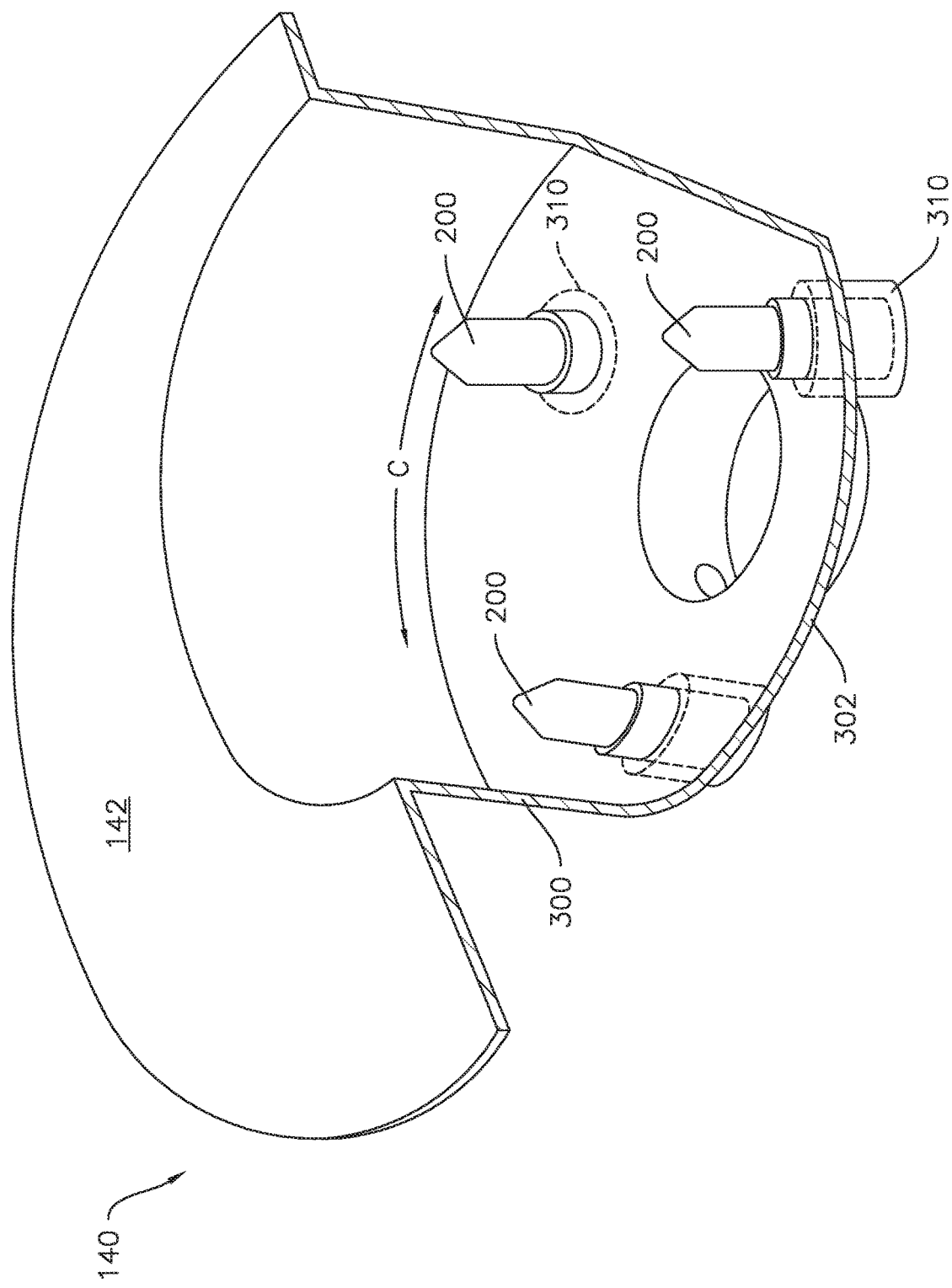
FIG. 3 provides a partially sectioned perspective view of a sump in accordance with one or more embodiments of the present disclosure which may be incorporated into dishwasher appliances such as the dishwasher appliance of FIG. 1.
Figure 4:
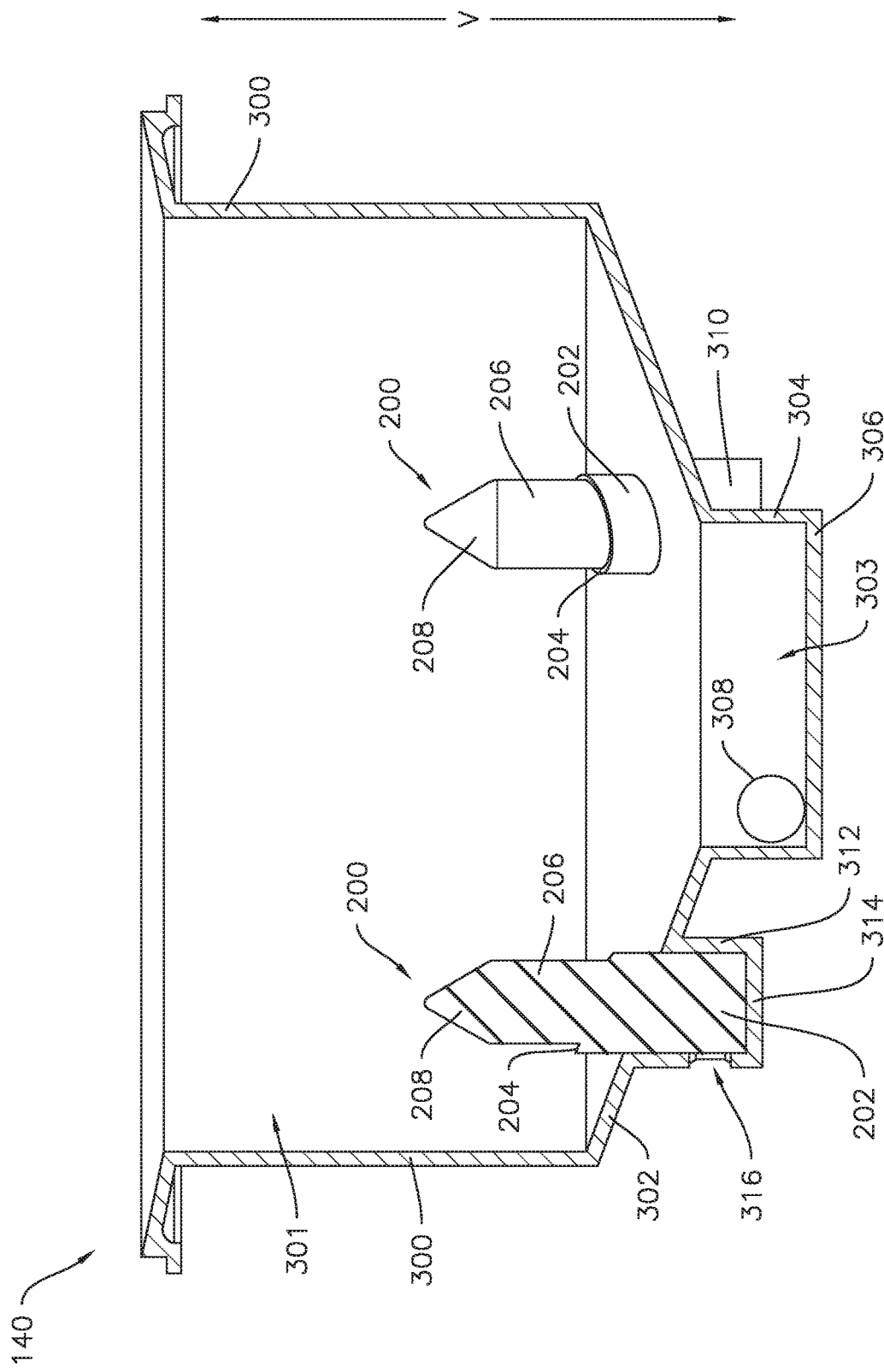
FIG. 4 provides a side sectional view of the sump of FIG. 3.

FIGS. 3 and 4 illustrate portions of the dishwasher appliance 100 according to one or more embodiments of the present invention. In particular, FIGS. 3 and 4 depict an example embodiment of the sump 140 and a plurality of resilient mounting posts 200 disposed within the sump 140. For example, three resilient mounting posts 200 may be provided, as in the illustrated embodiments. In other examples, any suitable number of resilient mounting posts 200 may be provided, such as one, two, four, or more posts 200. As will be described in more detail below, the resilient mounting posts 200 may be configured to mount and suspend the fluid circulation assembly 156 in the sump 140. In various embodiments, the resilient mounting post or posts 200 may extend between the fluid circulation assembly 156 and a wall of the sump 140, e.g., one or both of a base wall 302 or a sidewall 300 of the sump 140. The resilient mounting posts 200 may also be configured to vibrationally isolate the fluid circulation assembly 156 from the sump 140. For example, during operation of the dishwasher appliance 100, as various parts of the fluid circulation assembly 156 move, e.g., rotate and/or vibrate, the energy of such motion may be dampened or absorbed by the resilient mounting posts 200 rather than transferred to the sump 140, thereby reducing the overall sound level produced by the dishwasher appliance 100 during operation thereof.

The sump 140 may include and define, for example, a chamber 301 which receives the fluid from the wash chamber 106. As illustrated in FIGS. 3 and 4, sump 140 may include a sidewall 300 and a base wall 302 which define the chamber 301. The sidewall 300 may extend from the base wall 302, such as generally along the vertical direction V (FIG. 4), to, e.g., the bottom wall 142 of the tub 104. In some embodiments, the sidewall 302 may have a generally circular cross-sectional shape. Alternatively, the sidewall 302 may have a generally rectangular or other suitable polygonal cross-sectional shape, with multiple linear or curvilinear portions. The sump 140 may define a circumferential direction C, e.g., along the sidewall 302 as shown in FIG. 3. As best seen in FIG. 3, the plurality of resilient mounting posts 200 may be equidistantly spaced along the circumferential direction C around the sump 140.

The resilient mounting post 200, or each mounting post 200 of a plurality of mounting posts 200, may include a resilient material. For example, the resilient mounting post 200 may include or be formed of a resilient elastomeric material, such as rubber. Suitable rubber materials for the resilient mounting post 200 include but are not limited to silicon rubber, EPDM rubber, and other similar resilient materials.

As may be seen in FIGS. 3 and 4, the resilient mounting post 200 may include a base 202, a shaft 206 and a conical tip 208. The base 202 may be larger, e.g., may have a greater diameter, than the shaft 206. A shoulder 204 may be provided between the base 202 and the shaft 206. For example, the shoulder 204 may be defined by the difference in diameter between the base 202 and the shaft 206, as shown in the illustrated example embodiments. In other embodiments, the shoulder 204 may be larger, e.g., may have a greater diameter, than at least a portion of the base 202.

The base 202 of the shaft 200 may be received in a socket 310 defined in the sump 140. For example, the socket 310 may be defined in the base wall 302 of the sump 140. As shown in FIG. 4, the socket 310 may include a base wall 314, a sidewall 312 extending between the base wall 314 of the socket 310 and the base wall 302 of the sump 140, and a notch 316 formed in the side wall 312. The socket 310 may be sized such that it is slightly smaller, e.g., has a lesser diameter, than the base 202 of the resilient mounting post 200, such that the resilient material, e.g., rubber, of the base 202 may be compressed when the base 202 is received in the socket 310, whereupon a portion of the base 202 that coincides with the notch 316 may expand into the notch 316 to enhance a fit between the base 202 and the socket 310. As best seen in FIG. 4, when the base 202 of the resilient mounting post 200 is received in the socket 310, the resilient mounting post 200, and in particular the shaft 206 thereof, may extend from the base wall 302 of the sump 140 generally along the vertical direction V.

As shown, e.g., in FIGS. 3 and 4, the base 202 may define a first end or terminal portion of the resilient mounting post 200 and the conical tip 208 may define a second end or terminal portion of the resilient mounting post 200 opposite from the first end of the resilient mounting post 200. The base 202 and the conical tip 208 may be spaced apart, e.g., along the vertical direction V when the resilient mounting post 200 is received within the socket 310, as may be best seen in FIG. 4. One or both of the base 202 and the shaft 206 may be cylindrical. In various embodiments, the base 202 and the shaft 206 may be the same shape or may have different shapes. In some embodiments, e.g., as illustrated in FIGS. 3 and 4, the shoulder 204 may be obliquely oriented to the base 202 and the shaft 206. As such, the shoulder 204 may be elliptical in shape. For example, the shoulder 204 may be oblique to the base 202 and the shaft 206 at an angle that generally matches an angle of a bottom wall 554 of a filter 550 (FIG. 5) and/or a bottom portion 324 (FIG. 6) of a sleeve 318 in the fluid circulation assembly 156.

Figure 5:
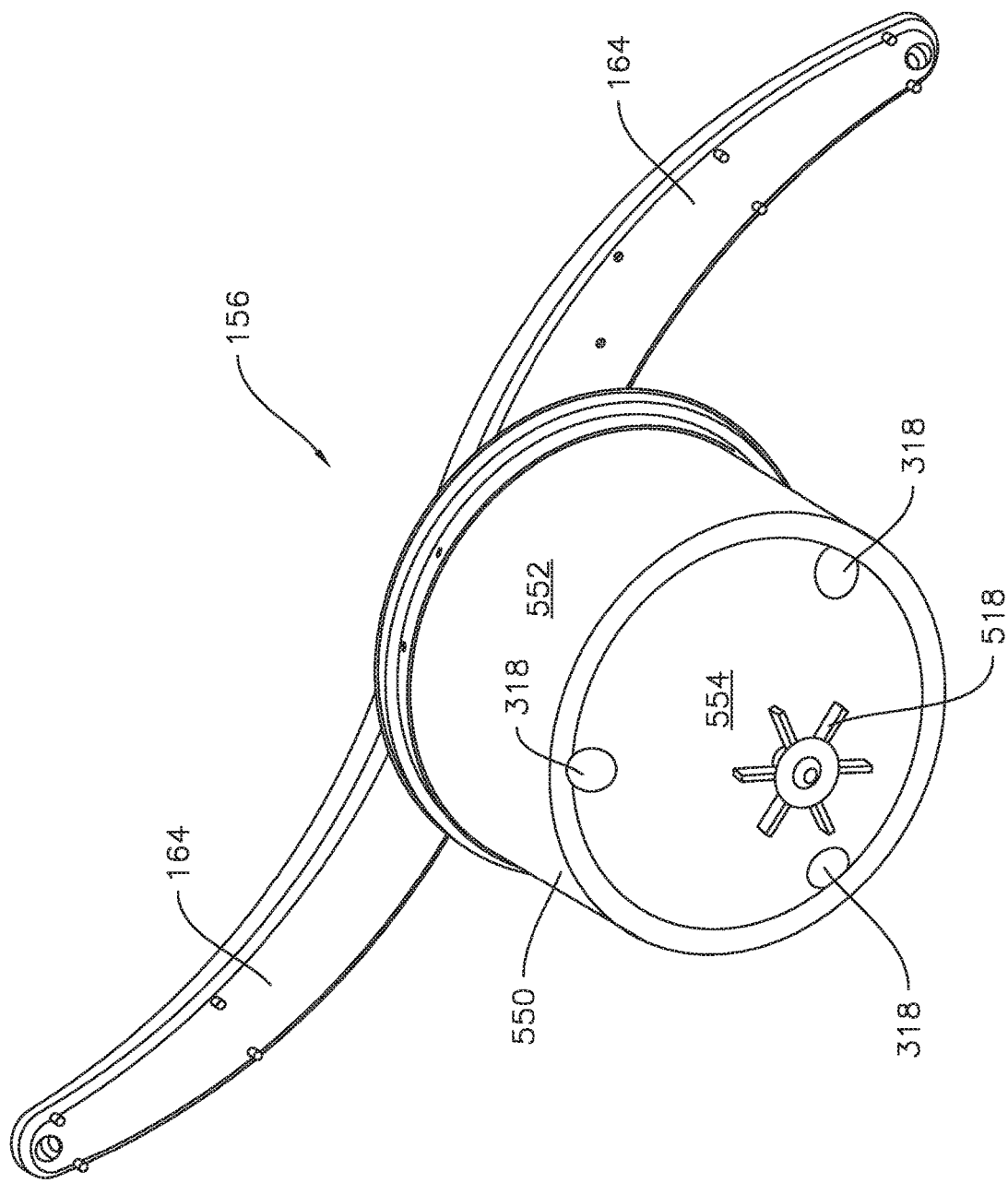
FIG. 5 provides a perspective view of a fluid circulation assembly in accordance with one or more embodiments of the present disclosure which may be incorporated into dishwasher appliances such as the dishwasher appliance of FIG. 1.

FIG. 5 provides a bottom perspective view of an exemplary fluid circulation assembly 156. As may be seen in FIG. 5, the fluid circulation assembly 156 may include one or more sleeves 318 defined in the bottom of the fluid circulation assembly 156. As noted above, the resilient mounting post or posts 200 may extend upward along the vertical direction V when the mounting posts 200 are installed in respective sockets 310 in the base wall 302 of the sump 140. Accordingly, the fluid circulation assembly 156 may be mounted in the sump 140 by lowering the fluid circulation assembly 156 onto the resilient mounting posts 200. For example, the conical tip 208 of each resilient mounting post 200 may improve the ease of installation of the fluid circulation assembly 156. The installer or user may not be able to see the resilient mounting posts 200 when mounting the fluid circulation assembly 156 within the sump 140, because the fluid circulation assembly 156 itself may occlude the resilient mounting posts 200 from view. The conical tips 208 may thus provide or enhance alignment of the shafts 206 with each respective sleeve 318 of the fluid circulation assembly 156 when mounting the fluid circulation assembly 156 in the sump 140.

Figure 6:
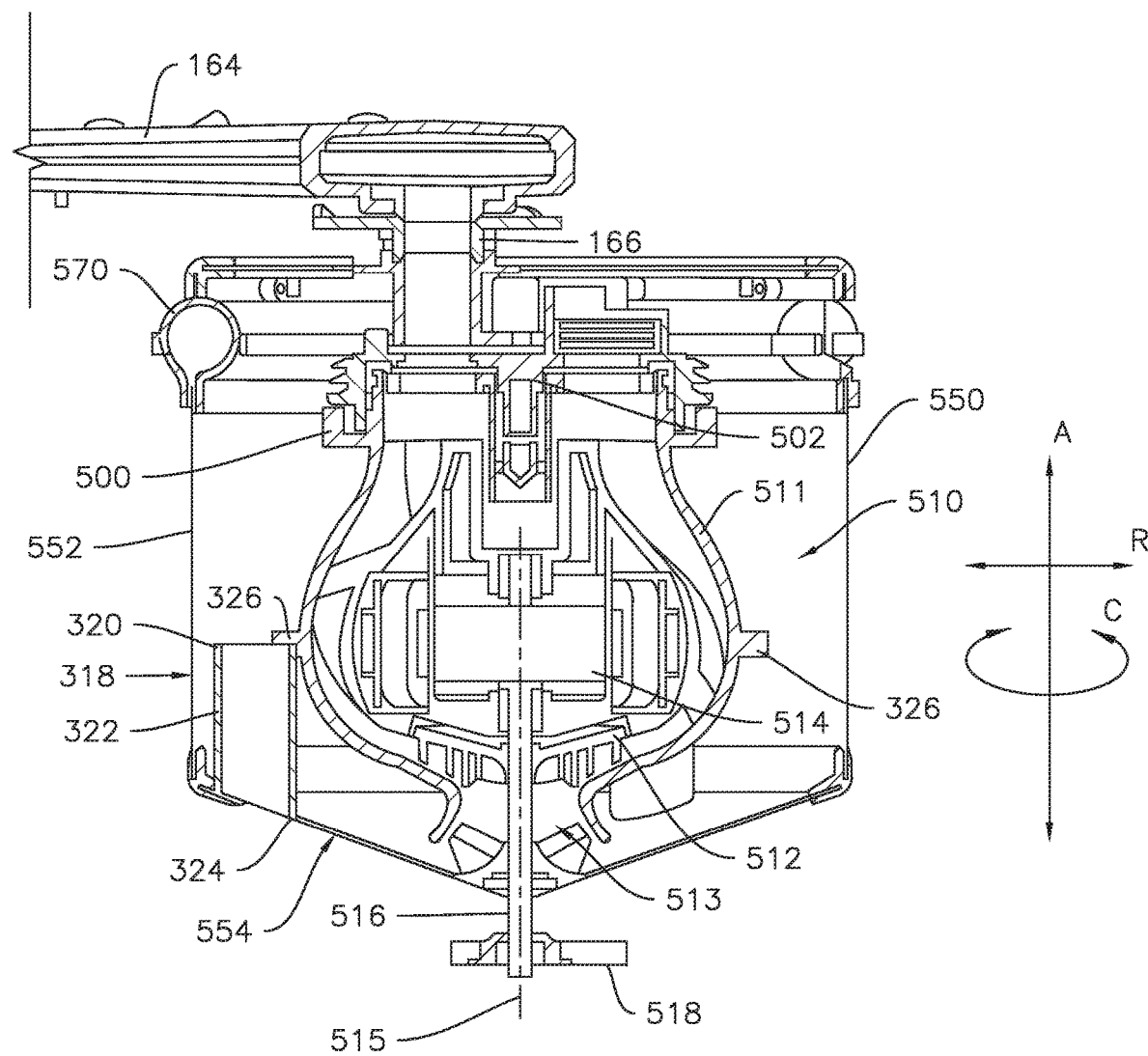
FIG. 6 provides a side sectional view of the fluid circulation assembly of FIG. 5.

As shown in FIG. 6, each sleeve 318 of the fluid circulation assembly 156 includes a sidewall 322, which may be, e.g., cylindrical. The sidewall 322 extends between an open bottom portion 324 and a top portion 320. The fluid circulation system 156 may also include a pump 510 with a housing 511, as described in more detail below. The housing 511 may include a flange 326 extending around the housing 511 and in contact with the sleeves 318. For example, as shown in FIG. 6, the flange 326 may contact the top portion 320 of each sleeve 318. In at least some embodiments, the sleeve 518 may be directly connected to the pump 510, e.g., to the housing 511 at the flange 326.

Figure 7:
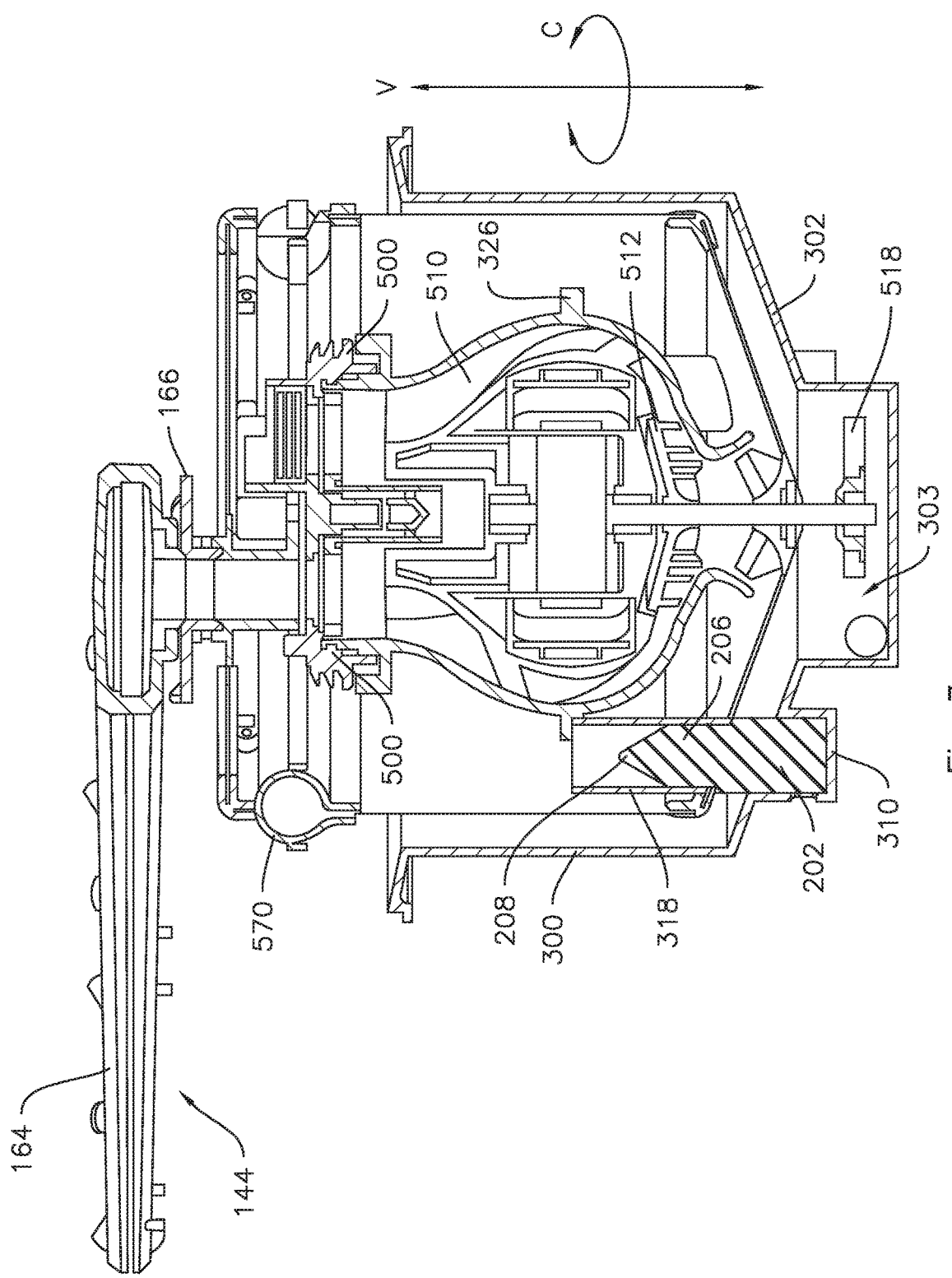
FIG. 7 provides a side sectional view of the fluid circulation assembly of FIG. 5 mounted within the sump of FIG. 3.

The fluid circulation assembly 156 may include a pump 510 which provides pressurized fluid flow to a diverter 500. Pump 510 may include a circulation impeller 512. In some embodiments, the circulation impeller 512 may be enclosed within a housing 511, and the housing 511 may include an intake 513 for drawing fluid into pump 510, e.g., to the circulation impeller 512. Pump 510 may further include a motor 514 and a drive shaft 516 which connects the motor 514 and the circulation impeller 512. For example, the motor 514 may be disposed within the chamber 301 of the sump 140, and may be hermetically sealed to prevent damage thereto from fluids within the chamber 301. As shown in FIG. 6, the drive shaft 516 may define a central axis 515, which extends along an axial direction A. A radial direction R may extend perpendicularly to the axial direction A and the circumferential direction C may extend around the axial direction A. As shown in FIG. 7, when the fluid circulation assembly 156 is mounted in the sump 140, the drive shaft 516 may be oriented generally vertically such that the axial direction A generally corresponds to the vertical direction V. The circulation impeller 512 may spin along the circumferential direction C when activated by the motor 514 to influence the flow of fluid within the chamber 301 of the sump 140.

As illustrated, the fluid circulation assembly 156 may also include a filter 550 disposed at least partially within the chamber 301. As shown in FIGS. 6 and 7, the filter 550 surrounds the impeller 512, and can additionally surround other components of the pump 510 such as the motor 514. Accordingly, the filter 550 may define an unfiltered volume and a filtered volume within the sump chamber 301. That is, the unfiltered volume may be the portion of sump chamber 301 upstream of the filter 550 with respect to a primary flow direction and the filtered volume may be the portion of sump chamber 301 downstream of the filter 550 with respect to the primary flow direction. Further, it is understood that the unfiltered volume 244 is unfiltered relative to the filter 250. Thus, where the filter surrounds at least the intake 513 and impeller 512 of the pump 510, e.g., where the intake 513 is disposed within the filtered volume, the pump 510 may receive or draw in filtered fluid from the filtered volume of the chamber 301 and provide such filtered fluid that is relatively (as compared to fluid in the unfiltered volume) free of soil to the wash chamber 106.

The filter 550 may include a sidewall 552. The sidewall 552 may extend generally along the vertical direction V, e.g., within 10 degrees of vertical. In some embodiments, the sidewall 552 may have a generally circular cross-sectional shape, e.g., as illustrated in FIG. 5. Alternatively, the sidewall 552 may have a generally rectangular or other suitable polygonal cross-sectional shape, with multiple linear or curvilinear portions. The fluid circulation assembly 156 may further include a cleaning manifold 570. The cleaning manifold may be configured to provide fluid to an outer surface of the filter sidewall 552 for cleaning of the sidewall 552. In particular, fluid flowing from the pump 510 may, as discussed below, be diverted to the manifold 570. The fluid in the manifold 570 may then be flowed from the manifold 570 towards and onto the outer surface of the sidewall 552. The flow of fluid onto and on the outer surface may advantageously clean the sidewall 552 by dislodging and removing soil from the sidewall 552.

As mentioned, the fluid circulation assembly 156 may further include a diverter 500. Diverter 500 may be configured for selectively flowing fluid to the wash chamber 106 (such as via one or more of the spray assemblies) or to the cleaning manifold 570, depending on the position of a valve 510 within the diverter 500. As shown in FIG. 7, the exemplary diverter 500 may be in fluid communication with the pump 510 for receiving a flow of fluid from pump 510 that is to be supplied to one or more of the spray assemblies 144, 148, and/or 150 or cleaning manifold 570, as well as other fluid-using components during cleaning operations. During operation of the dishwasher appliance 100, pump 510 receives fluid from, e.g., sump 140 and provides a fluid flow to diverter 500.

In addition, fluid circulation assembly 156 may be configured for periodically discharging soiled wash fluid from the dishwasher appliance 100, e.g., from the unfiltered volume of the sump 140. More specifically, fluid circulation assembly 156 may include a drain impeller 518 disposed on a bottom portion of the drive shaft 516 below the circulation impeller 510 and within a drain volume 303. Drain volume 303 is defined between a bottom wall 306 and at least one sidewall 304 with a drain outlet 308 defined in the side wall 304 or one of the sidewalls 304. The drain volume 303 is positioned at the very bottom of the sump 140, such that wash fluid collects within drain volume 303. During a drain cycle, drain impeller 518 is rotated and soiled wash fluid is discharged through the drain outlet 308 and into a discharge conduit (not shown). After some or all of the soiled wash fluid is discharged, fresh water and/or wash additives may be added and the wash or rinse cycle may be repeated. The drain impeller 518 may be coupled to the drive shaft 516 using a one-way clutch. In this regard, during a wash pump mode, the motor 514 rotates the drive shaft 516 in one direction, e.g., a first direction, pumping filtered wash fluid using circulation impeller 512. When drive shaft 516 rotates in the first direction, the one-way clutch is disengaged, so drain impeller 518 does not rotate. By contrast, during a drain pump mode, the motor 514 may rotate the drive shaft 516 in the opposite direction, e.g., a second direction opposing the first direction, thereby engaging the one-way clutch and causing the drain impeller 518 to rotate and discharge wash fluid.

Additionally, the circulation impeller 512 may be configured such that it is more efficient in the first direction of rotation than in the second direction of rotation. For example, as is generally understood in the art, the circulation impeller 512 may include blades (not shown), and the blades may have a cross-sectional profile and may define an angle with respect to the vertical direction V. Thus, the circulation impeller 512 may be configured such that the profile and angle of the blades make it more efficient in the first direction of rotation than in the second direction of rotation. Accordingly, when the drive shaft 516 rotates in the second direction, the drain impeller 518 will draw fluid from the sump 140 much faster than the circulation impeller 512, until the fluid level in the sump 140 drops below the intake 513, at which point the circulation impeller 512 will not draw in any more fluid and all remaining liquid in the sump 140 will be drawn by the drain impeller 518 as long as the motor 514 continues to rotate the drive shaft 516 in the second direction. The general principles of impeller blade design are understood by those of ordinary skill in the art and are not discussed in greater detail herein.

Accordingly, the fluid circulation assembly 156 includes several moving parts, at least some of which are described above, which may contribute to the generation of noise during various cycles of the dishwashing operation. For example, operation of the fluid circulation assembly 156 may result in vibrations which may generate a level of noise which is perceptible by a user of the dishwasher appliance 100, e.g., in an adjacent or nearby living space to the dishwasher appliance 100, particularly when such vibrations are transferred to the sump 140. For example, the impellers 512 and 518 may be rotated at a relatively high speed, e.g., high enough to generate user-perceptible noise when vibrations from such rotation are transferred to the sump 140.

To prevent or minimize the generation of such user-perceptible noise, the fluid circulation assembly 156 may be mounted in the sump 140 with the one or more resilient mounting posts 200, whereby the fluid circulation assembly 156 is vibrationally isolated from the sump 140. For example, the resilient mounting post 200, and in particular the base 202 thereof, may absorb vibrations from the fluid circulation assembly 156 during operation.

As may be seen in FIG. 7, the resilient mounting post 200, in particular the shaft 206 thereof, may be received within the sleeve 318 of the fluid circulation assembly 156. The bottom portion 324 (FIG. 6) of the sleeve 318 may rest on the shoulder 204 (FIG. 4) of the resilient mounting post 200. As shown in FIG. 7, the fluid circulation assembly 156 may be suspended within the sump 140 by the resilient mounting posts 200. For example, the fluid circulation assembly 156 may be spaced from each of the sidewall 300 and the base wall 302 of the sump 140. Accordingly, the fluid circulation assembly 156 may be only connected to the sump 140 via the resilient mounting posts 200 so that vibrations from the fluid circulation assembly 156 during operation, e.g., due to rotation of the spray arm 164 and/or operation of the pump 510, etc., may be transferred to and dampened by the resilient mounting posts 200 before they reach the sump 140, resulting in a reduction or elimination of user-perceptible noise generated by operation of the fluid circulation assembly 156. For example, in embodiments e.g., as described above, where the pump 510 is directly connected to the sleeve or sleeves 318, motion and vibration of the pump 510 may be readily transferred to and absorbed by the resilient mounting post 200 via the sleeve 318.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A dishwasher appliance defining a vertical direction, a lateral direction, and a transverse direction that are mutually perpendicular, the dishwasher appliance comprising:
   a tub defining a wash chamber for receipt of articles for washing;
   a sump positioned at a bottom of the wash chamber for receiving fluid from the wash chamber; and
   a fluid circulation assembly at least partially disposed within the sump, the fluid circulation assembly comprising a sleeve, the sleeve comprising a sidewall extending along the vertical direction from an open bottom portion to a top portion, the fluid circulation assembly mounted in the sump with a resilient mounting post, whereby the fluid circulation assembly is vibrationally isolated from the sump, the resilient mounting post comprising a base, a shoulder extending fully around a circumference of the resilient mounting post, and a shaft, the base of the resilient mounting post received within a socket defined in the sump, the shaft of the resilient mounting post received within the sleeve with the bottom portion of the sleeve resting on the shoulder of the resilient mounting post, wherein the sleeve defines a height along the vertical direction from the open bottom portion of the sleeve to the top portion of the sleeve and the shaft of the resilient mounting post defines a length along the vertical direction from the shoulder of the resilient mounting post to an end of the resilient mounting post, the height of the sleeve greater than the length of the shaft whereby the shaft of the resilient mounting post is fully enclosed within the sleeve, wherein the socket comprises a sidewall, the sidewall of the socket defining an inner diameter, and wherein the base of the resilient mounting post comprises an outer diameter, the inner diameter of the socket less than the outer diameter of the base, whereby the base of the resilient mounting post is compressed within the socket.

2. The dishwasher appliance of claim 1, wherein the sump comprises a base wall and a side wall, the resilient mounting post extending between the fluid circulation assembly and one of the base wall of the sump and the side wall of the sump.

3. The dishwasher appliance of claim 1, wherein the socket is defined in a base wall of the sump.

4. The dishwasher appliance of claim 1, wherein the sleeve is directly connected to a pump of the fluid circulation assembly.

5. The dishwasher appliance of claim 1, wherein the resilient mounting post comprises a conical tip.

6. The dishwasher appliance of claim 1, wherein the fluid circulation assembly comprises a motor, a pump, a drain impeller, a circulation impeller, a filter, a diverter, and a spray arm.

7. The dishwasher appliance of claim 1, wherein the resilient mounting post is one of a plurality of resilient mounting posts equidistantly spaced along a circumferential direction around the sump.

8. The dishwasher appliance of claim 1, wherein the resilient mounting post comprises an elastomeric material.

9. A dishwasher appliance defining a vertical direction, a lateral direction, and a transverse direction that are mutually perpendicular, the dishwasher appliance comprising:
- a tub defining a wash chamber for receipt of articles for washing;
- a sump positioned at a bottom of the wash chamber for receiving fluid from the wash chamber; and
- a resilient mounting post disposed within the sump, the resilient mounting post configured to mount a fluid circulation assembly in the sump and configured to vibrationally isolate the fluid circulation assembly from the sump, wherein the resilient mounting post comprises a base extending along the vertical direction from a first end of the resilient mounting post to a shoulder of the resilient mounting post and a shaft extending along the vertical direction from the shoulder to a second end of the resilient mounting post, the base of the resilient mounting post received within a socket defined in the sump, wherein the shoulder extends fully around a circumference of the resilient mounting post, wherein the shoulder defines a first outer diameter, the shaft defines a second outer diameter, and the first outer diameter is greater than the second outer diameter, wherein the socket comprises a sidewall, the sidewall of the socket defining an inner diameter, wherein the base of the resilient mounting post comprises a third outer diameter, the inner diameter of the socket less than the third outer diameter of the base, whereby the base of the resilient mounting post is compressed within the socket.

10. The dishwasher appliance of claim 9, wherein the sump comprises a base wall and a side wall, the resilient mounting post extending from the base wall of the sump generally along the vertical direction.

11. The dishwasher appliance of claim 9, wherein the socket is defined in a base wall of the sump.

12. The dishwasher appliance of claim 9, wherein the shaft of the resilient mounting post is configured to be received within a sleeve of the fluid circulation assembly.

13. The dishwasher appliance of claim 9, wherein the resilient mounting post comprises a conical tip.

14. The dishwasher appliance of claim 9, wherein the resilient mounting post is one of a plurality of resilient mounting posts equidistantly spaced along a circumferential direction around the sump.

15. The dishwasher appliance of claim 9, wherein the resilient mounting post comprises an elastomeric material.

16. The dishwasher appliance of claim 9, further comprising a notch in the sidewall of the socket.

* * * * *